United States Patent
Sodhi et al.

(10) Patent No.: US 10,982,127 B2
(45) Date of Patent: Apr. 20, 2021

(54) WELL CEMENTING WITH WATER-BASED LIQUID ANTI-SHRINKAGE ADDITIVES

(71) Applicant: Halliburton Energy Services, Inc., Houston, TX (US)

(72) Inventors: Thomas Singh Sodhi, New Caney, TX (US); Kyriacos Agapiou, Houston, TX (US); Aleksey Kolasnikov, Humble, TX (US); Sam J. Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 91 days.

(21) Appl. No.: 16/325,518

(22) PCT Filed: Sep. 12, 2016

(86) PCT No.: PCT/US2016/051391
§ 371 (c)(1),
(2) Date: Feb. 14, 2019

(87) PCT Pub. No.: WO2018/048456
PCT Pub. Date: Mar. 15, 2018

(65) Prior Publication Data
US 2019/0194522 A1 Jun. 27, 2019

(51) Int. Cl.
*C09K 8/467* (2006.01)
*C04B 28/04* (2006.01)
(Continued)

(52) U.S. Cl.
CPC .......... *C09K 8/467* (2013.01); *C04B 22/008* (2013.01); *C04B 22/066* (2013.01);
(Continued)

(58) Field of Classification Search
CPC . C09K 8/42; C09K 8/46; C09K 8/467; C09K 8/487; C09K 8/493; C04B 22/008;
(Continued)

(56) References Cited

U.S. PATENT DOCUMENTS

| | | |
|---|---|---|
| 3,957,674 A | 5/1976 | Sano et al. |
| 4,500,357 A * | 2/1985 | Brothers .......... C04B 24/16 106/717 |

(Continued)

FOREIGN PATENT DOCUMENTS

WO 2015034477 3/2015

OTHER PUBLICATIONS

ISRWO International Search Report and Written Opinion for PCT/US2016/051391 dated Jun. 8, 2017.

*Primary Examiner* — Angela M DiTrani Leff
(74) *Attorney, Agent, or Firm* — Thomas Rooney; C. Tumey Law Group PLLC

(57) ABSTRACT

A method including introducing a well cementing composition into a wellbore, the cementing composition including a pumpable slurry of cement comprising a liquid anti-shrinkage additive including: an aqueous base fluid; a calcined magnesium oxide; and an anti-hydration agent; and allowing at least a portion of the cementing composition to harden. A liquid anti-shrinkage additive for cement including an aqueous base fluid, a calcined magnesium oxide, and an anti-hydration agent.

18 Claims, 2 Drawing Sheets

(51) Int. Cl.

| | | |
|---|---|---|
| *C04B 22/00* | (2006.01) | |
| *C04B 22/06* | (2006.01) | |
| *C04B 24/16* | (2006.01) | |
| *C04B 24/22* | (2006.01) | |
| *C04B 24/26* | (2006.01) | |
| *C04B 24/38* | (2006.01) | |
| *C04B 28/02* | (2006.01) | |
| *C04B 40/00* | (2006.01) | |
| *E21B 33/14* | (2006.01) | |
| *C04B 103/44* | (2006.01) | |

(52) U.S. Cl.
CPC ............ *C04B 24/166* (2013.01); *C04B 24/22* (2013.01); *C04B 24/2641* (2013.01); *C04B 24/2652* (2013.01); *C04B 24/38* (2013.01); *C04B 24/383* (2013.01); *C04B 28/02* (2013.01); *C04B 28/04* (2013.01); *C04B 40/0039* (2013.01); *E21B 33/14* (2013.01); *C04B 2103/44* (2013.01)

(58) Field of Classification Search
CPC ..... C04B 22/066; C04B 24/166; C04B 24/22; C04B 24/2641; C04B 24/2652; C04B 24/38; C04B 24/383; C04B 28/02; C04B 28/04; C04B 40/0039; C04B 2103/44; E21B 33/14

See application file for complete search history.

(56) References Cited

U.S. PATENT DOCUMENTS

| | | | | |
|---|---|---|---|---|
| 4,557,763 | A * | 12/1985 | George | C04B 24/16 106/706 |
| 4,797,159 | A * | 1/1989 | Spangle | C09K 8/46 106/694 |
| 4,834,957 | A * | 5/1989 | Van de Walle | C05D 5/00 423/268 |
| 5,086,850 | A * | 2/1992 | Harris | C04B 7/527 175/61 |
| 5,942,031 | A * | 8/1999 | Cheung | C04B 14/304 106/801 |
| 7,543,646 | B2 * | 6/2009 | Huang | C09K 8/5045 166/279 |
| 8,784,558 | B2 * | 7/2014 | Berke | C04B 40/0039 106/801 |
| 10,526,523 | B2 * | 1/2020 | Droger | C09K 8/467 |
| 10,737,978 | B2 * | 8/2020 | Lewis | E21B 33/13 |
| 2005/0241538 | A1 * | 11/2005 | Vargo, Jr. | C09K 8/467 106/713 |
| 2008/0105167 | A1 | 5/2008 | Santra et al. | |
| 2010/0006288 | A1 * | 1/2010 | Santra | C09K 8/487 166/292 |
| 2012/0138299 | A1 * | 6/2012 | Joseph | C04B 28/06 166/293 |
| 2012/0298012 | A1 | 11/2012 | Berke et al. | |
| 2017/0240794 | A1 * | 8/2017 | Iverson | E21B 33/14 |

\* cited by examiner

WELL CEMENTING WITH WATER-BASED LIQUID ANTI-SHRINKAGE ADDITIVES

BACKGROUND

Cement is used in the construction of oil and gas wells to structurally support the steel pipe casing that serves as a conduit between the reservoir and surface, to protect the steel pipe casing from corrosive elements, and to isolate and seal off subterranean zones to prevent undesirable fluid communication. It is essential to have good bonding between the cement and formation and cement and casing in order for the well to function safely and efficiently. Without proper bonding, channels, e.g. "microannuli", may form at the cement interfaces, compromising zonal isolation and ultimately limiting the effectiveness of the subsequent production processes.

To mitigate debonding phenomena, expansive cement systems are employed, which are formulated with chemical additives that promote volumetric expansion. Typical additives are based on calcium aluminates/calcium sulfates, fine metal powders (e.g. aluminum), or calcined magnesium oxide. All of the aforementioned additives are available in the solid form.

Aqueous (water-based) liquid versions, e.g. suspensions, of these additives are difficult to obtain due to the challenge of suppressing the expansive chemical reactions undergone by the active agent(s) when contacted with water. This is particularly troubling for offshore well operations, where liquid materials are preferred for storage and regulatory purposes. With respect to regulations, some off-shore areas, e.g. Gulf of Mexico, are requiring cement designs that exhibit "zero" shrinkage as an added engineering control to mitigate catastrophe. Furthermore, some regions of offshore work are governed by strict environmental regulations that prohibit the use of certain formulation chemicals. In particular, surfactants commonly formulated in oil-based suspensions may not be allowed in such regions. Accordingly, there is a need for aqueous liquid additives that provide expansion and prevent shrinkage in well cements.

BRIEF DESCRIPTION OF THE DRAWINGS

The following figure is included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

Figure 1:
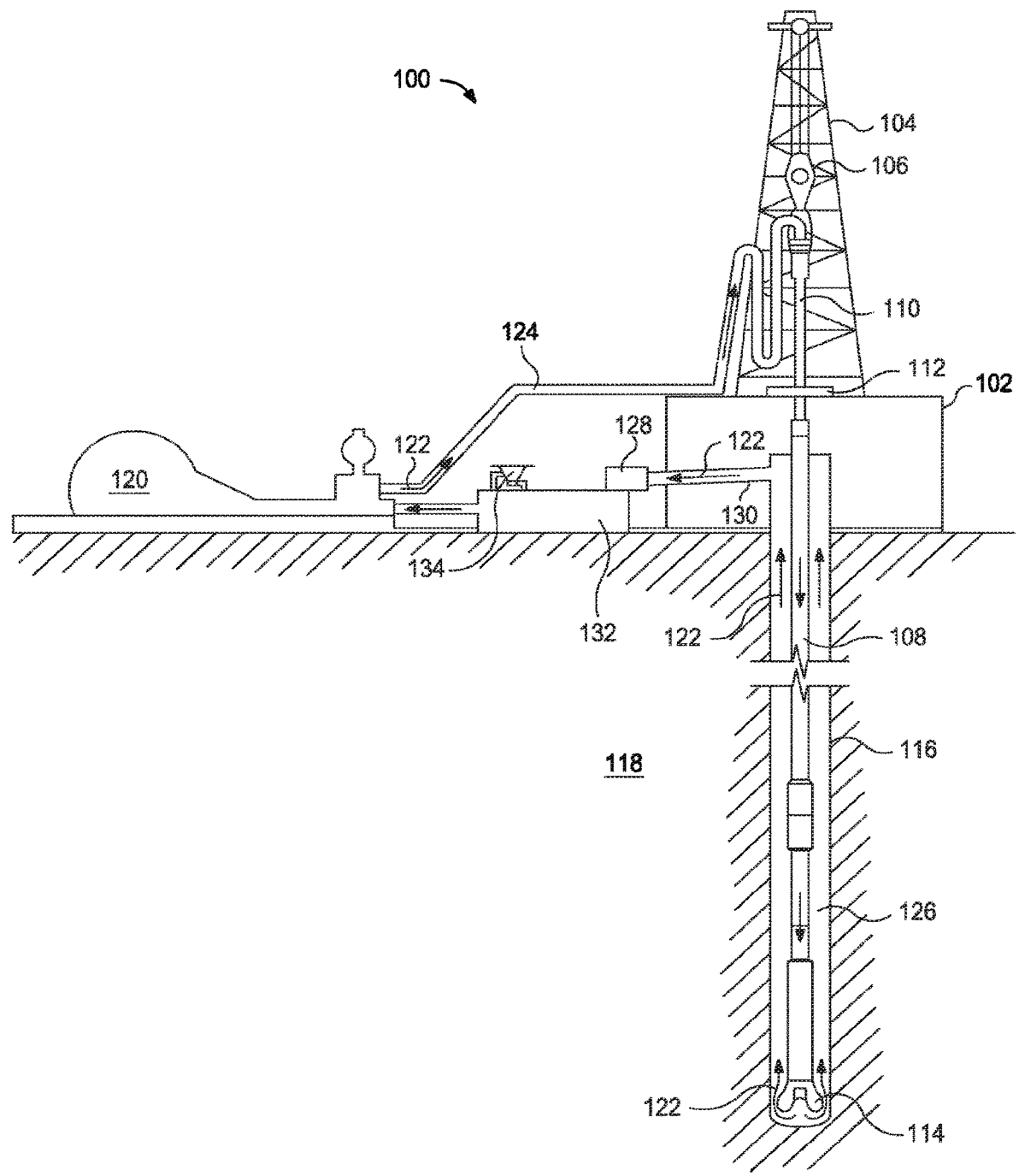
FIG. 1 depicts an embodiment of a system configured for delivering the cements described herein to a downhole location.

The present invention relates to aqueous liquid anti-shrinkage additives for cement and applications in well cementing. The aqueous liquid anti-shrinkage additives of the invention make use of anti-hydration agents which prevent the active ingredients, magnesium oxide, from converting to magnesium hydroxide when in slurry. The aqueous liquid anti-shrinkage additives of the invention have demonstrated ability to provide expansion in test cement designs after at least 30 days of storage.

In some embodiments, the invention is related to a method comprising: introducing a well cementing composition into a wellbore, said cementing composition including a pumpable slurry of cement comprising a liquid anti-shrinkage additive comprising: an aqueous base fluid; a calcined magnesium oxide; and an anti-hydration agent; and allowing at least a portion of the cementing composition to harden. The liquid anti-shrinkage additive may not contain non-calcined magnesium oxide. The liquid anti-shrinkage additive may further comprise a viscosifying additive. The calcined magnesium oxide may be at least one selected from dead-burned magnesium oxide, light-burned magnesium, and combinations thereof. The anti-hydration agent may comprise at least one of a lignin sulfonate, a sulfonated naphthalene condensate, a sulfonated acetone formaldehyde condensate (SAFC), a polyphosphate, an aminophosphonate, aminophosphonic acids, and combinations thereof. The anti-hydration agent may be at least one selected from sodium hexametaphosphate (SHMP), aminotris(methylenephosphonic acid) (ATMP), and combinations thereof. The viscosifying additive may comprise at least one of a polysaccharide biopolymer, a cellulosic polymer, a synthetic acrylic polymer, and combinations thereof. The polysaccharide biopolymer is at least one selected from xanthan, welan, diutan gums, and combinations thereof. The cellulosic polymer may be hydroxyethyl cellulose (HEC). The synthetic acrylic polymer may be at least one of poly(acrylic acid) (PAA), poly(acrylamide) (PAM), copolymers thereof (PAA-PAM), and combinations thereof. The liquid anti-shrinkage additive may be stable after remaining in suspension for at least 30 days. In some embodiments, the pumpable slurry of cement does not contain non-calcined magnesium oxide.

Several embodiments of the invention are directed to an aqueous liquid anti-shrinkage additive for cement comprising: an aqueous base fluid; a calcined magnesium oxide; and an anti-hydration agent. The liquid anti-shrinkage additive may not contain non-calcined magnesium oxide. The liquid anti-shrinkage additive may further comprise a viscosifying additive. The calcined magnesium oxide may be at least one selected from dead-burned magnesium oxide, light-burned magnesium, and combinations thereof. The anti-hydration agent may comprise at least one of a lignin sulfonate, a sulfonated naphthalene condensate, a sulfonated acetone formaldehyde condensate (SAFC), a polyphosphate, an aminophosphonate, aminophosphonic acids, and combinations thereof. The anti-hydration agent may be at least one selected from sodium hexametaphosphate (SHMP), aminotris(methylenephosphonic acid) (ATMP), and combinations thereof. The viscosifying additive may comprise at least one of a polysaccharide biopolymer, a cellulosic polymer, a synthetic acrylic polymer, and combinations thereof. The polysaccharide biopolymer is at least one selected from xanthan, welan, diutan gums, and combinations thereof. The cellulosic polymer may be hydroxyethyl cellulose (HEC). The synthetic acrylic polymer may be at least one of poly(acrylic acid) (PAA), poly(acrylamide) (PAM), copolymers thereof (PAA-PAM), and combinations thereof. The liquid anti-shrinkage additive may be stable after remaining in suspension for at least 30 days.

Certain embodiments of the invention are directed to a composition for well cementing including a pumpable slurry of cement comprising a liquid anti-shrinkage additive comprising: an aqueous base fluid; a calcined magnesium oxide; and an anti-hydration agent. The liquid anti-shrinkage additive may not contain non-calcined magnesium oxide. The liquid anti-shrinkage additive may further comprise a viscosifying additive. The calcined magnesium oxide may be at least one selected from dead-burned magnesium oxide, light-burned magnesium, and combinations thereof. The anti-hydration agent may comprise at least one of a lignin sulfonate, a sulfonated naphthalene condensate, a sulfonated acetone formaldehyde condensate (SAFC), a polyphosphate, an aminophosphonate, aminophosphonic acids, and combinations thereof. The anti-hydration agent may be at least one selected from sodium hexametaphosphate (SHMP), amino-tris(methylenephosphonic acid) (ATMP), and combinations thereof. The viscosifying additive may comprise at least one of a polysaccharide biopolymer, a cellulosic polymer, a synthetic acrylic polymer, and combinations thereof. The polysaccharide biopolymer is at least one selected from xanthan, welan, diutan gums, and combinations thereof. The cellulosic polymer may be hydroxyethyl cellulose (HEC). The synthetic acrylic polymer may be at least one of poly(acrylic acid) (PAA), poly(acrylamide) (PAM), copolymers thereof (PAA-PAM), and combinations thereof. In some embodiments, the pumpable slurry of cement does not contain non-calcined magnesium oxide.

Some embodiments of the invention are directed to a cementing system comprising an apparatus including a mixer and a pump to place a cement composition in a wellbore, said cement composition comprising: a pumpable slurry of cement comprising a liquid anti-shrinkage additive, the additive comprising calcined magnesium oxide, and an anti-hydration agent.

General Measurement Terms

Unless otherwise specified or unless the context otherwise clearly requires, any ratio or percentage means by volume.

If there is any difference between U.S. or Imperial units, U.S. units are intended.

The conversion between pound per gallon (lb/gal or ppg) and kilogram per cubic meter (kg/m$^3$) is: 1 lb/gal=(1 lb/gal)×(0.4536 kg/lb)×(gal/0.003785 m$^3$)=119.8 kg/m$^3$.

Aqueous Liquid Anti-Shrinkage Additives

The aqueous liquid anti-shrinkage additives of the present invention comprise an aqueous base fluid, calcined magnesium oxide, an anti-hydration agent, and an optional viscosifying additive. The additives may be added to cement compositions that are used in well cementing operations.

In certain embodiments, the aqueous liquid anti-shrinkage additive may be present in the cement composition in an amount of from about 1% to about 15% by weight of cement composition, or from about 1% to about 5% by wt. of cement composition.

Aqueous Base Fluids

The liquid anti-shrinkage additive and cement slurry may include an aqueous base fluid from any source, provided that the fluids do not contain components that might adversely affect the stability and/or performance of the treatment fluids of the present invention. The aqueous base fluid may comprise fresh water, salt water, seawater, brine, or an aqueous salt solution. In the case of brines, the aqueous carrier fluid may comprise a monovalent brine or a divalent brine. Suitable monovalent brines may include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like.

In certain embodiments, the aqueous base fluid may be present in the liquid anti-shrinkage additive in an amount of from about 20% to about 95% by weight of the additive, from about 28% to about 90% by wt. of the additive, or from about 36% to about 80% by wt. of the additive.

In certain embodiments, the aqueous base fluid may be present in the cement composition in an amount of from about 20% to about 95% by weight of cement composition, from about 28% to about 90% by wt. of cement composition, or from about 36% to about 80% by wt. of cement composition.

Cementitious Materials

A variety of cements can be used in the present invention, including cements comprised of calcium, aluminum, silicon, oxygen, and/or sulfur which set and harden by reaction with water. Such hydraulic cements include Portland cements, pozzolan cements, gypsum cements, high alumina content cements, slag cements, high magnesia content cements, shale cements, acid/base cements, fly ash cements, zeolite cement systems, kiln dust cement systems, microfine cements, metakaolin, pumice and their combinations. Portland cements that may be suited for use in embodiments of the present invention may be classified as Class A, C, H and G cements according to American Petroleum Institute, API Specification for Materials and Testing for Well Cements, API Specification 10, Fifth Ed., Jul. 1, 1990. In addition, in some embodiments, hydraulic cements suitable for use in the present invention may be classified as ASTM Type I, II, or III. The cementitious materials may be combined with the aqueous base fluids to form a cement slurry.

Slurry Density

In certain embodiments, the cement compositions have a slurry density which is pumpable for introduction down hole. In exemplary embodiments, the density of the cement composition in slurry form is from about 7 pounds per gallon (ppg) to about 20 ppg, from about 8 ppg to about 18 ppg, or from about 9 ppg to about 17 ppg.

Calcined Magnesium Oxide

The magnesium oxide in the present invention is calcined. If an un-calcined magnesium oxide is used, then it reacts with water and may not allow expansion in the cement at a later time. The magnesium oxide may be calcined at different temperatures to produce magnesium oxide of varied reactivity. In some embodiments, dead-burned magnesium oxide, in which the calcination temperatures range from 1500-2000° C., may be used. In other embodiments, light-burned magnesium oxide, in which the calcination temperatures range from 700-1000° C., may be used. The degree of calcination would impact the operating temperature window of the additive. For example, dead-burned magnesium oxide may be used at higher operating temperatures than light-burned magnesium oxide owing to a greater amount of thermal energy needed to induce reactivity.

The calcined magnesium oxide may be present in the liquid anti-shrinkage additive in an amount of from about 5% to about 80% by weight of the additive, from about 10% to about 70% by wt. of the additive, or from about 20% to about 60% by wt. of the additive.

In some embodiments, non-calcined magnesium is not present in the liquid anti-shrinkage additive. In some embodiments, the pumpable slurry of cement does not contain non-calcined magnesium oxide.

Anti-Hydration Agents

The anti-hydration agent serves to prevent hydration of the calcined magnesium oxide when suspended in water. Without being limited by theory, it is believed that the anti-hydration agent complexes with magnesium nuclei at the surfaces of the magnesium oxide grains to form a coating that inhibits reaction with water. This inhibition may permit the magnesium oxide to remain suspended in water without significant conversion via hydration to magnesium hydroxide.

The anti-hydration agents may comprise a lignin sulfonate, a sulfonated naphthalene condensate, a sulfonated acetone formaldehyde condensate (SAFC), a polyphosphate, or an aminophosphonate. Suitable anti-hydration agents for the purposes of the invention are offered by Halliburton Energy Services, Inc., in Houston, Tex., under the trade names HR™-4 Retarder (calcium lignosulfate) and CFR™-3 Additive (cement friction reducer), sodium hexametaphosphate (SHMP), and aminotris(methylenephosphonic acid) and salts therefrom (ATMP).

In some embodiments it is advantageous to add the anti-hydration additive prior to the calcined magnesium oxide for improved rheology and mixing, as well as uniform dispersion to give optimal contact between the anti-hydration agent and the calcined magnesium oxide.

The anti-hydration agents may be present in the liquid anti-shrinkage additive in an amount of from about 0.1% to about 20% by weight of the additive, from about 0.2% to about 18% by wt. of the additive, or from about 0.3% to about 16% by wt. of the additive.

Viscosifying Additives

The liquid anti-shrinkage additives of the invention may optionally include a viscosifying agent. The viscosifying additive may comprise, without limitation, a polysaccharide biopolymer, such as xanthan, welan, or diutan gums, a cellulosic polymer, such as hydroxyethyl cellulose (HEC), or a synthetic acrylic polymer, such as poly(acrylic acid) (PAA), poly(acrylamide) (PAM), or copolymers thereof (PAA-PAM). A suitable viscosifying additive for the purposes of the invention is offered by Halliburton Energy Services, Inc., under the trade name BARAZAN™.

The viscosifying additives may be present in the liquid anti-shrinkage additive in an amount of from about 0.01% to about 5% by weight of the additive, from about 0.05% to about 3% by wt. of the additive, or from about 0.1% to about 2% by wt. of the additive.

Cement Additives

The cement compositions of the invention may contain additives. In certain embodiments, the additives comprise at least one of resins, latex, stabilizers, silica, pozzolans, microspheres, aqueous superabsorbers, viscosifying agents, suspending agents, dispersing agents, salts, accelerants, surfactants, retardants, defoamers, settling-prevention agents, weighting materials, fluid loss control agents, elastomers, vitrified shale, gas migration control additives, formation conditioning agents, and combinations thereof.

Wellbore and Formation

Broadly, a zone refers to an interval of rock along a wellbore that is differentiated from surrounding rocks based on hydrocarbon content or other features, such as perforations or other fluid communication with the wellbore, faults, or fractures. A treatment usually involves introducing a treatment fluid into a well. As used herein, a treatment fluid is a fluid used in a treatment. Unless the context otherwise requires, the word treatment in the term "treatment fluid" does not necessarily imply any particular treatment or action by the fluid. If a treatment fluid is to be used in a relatively small volume, for example less than about 200 barrels, it is sometimes referred to in the art as a slug or pill. As used herein, a treatment zone refers to an interval of rock along a wellbore into which a treatment fluid is directed to flow from the wellbore. Further, as used herein, into a treatment zone means into and through the wellhead and, additionally, through the wellbore and into the treatment zone.

As used herein, into a well means introduced at least into and through the wellhead. According to various techniques known in the art, equipment, tools, or well fluids can be directed from the wellhead into any desired portion of the wellbore. Additionally, a well fluid can be directed from a portion of the wellbore into the rock matrix of a zone.

As will be appreciated by those of ordinary skill in the art, embodiments of the cement compositions of the present invention may be used in a variety of subterranean applications, including primary and remedial cementing. For example, a cement slurry composition comprising cement, an anti-shrinkage additive, and water may be introduced into a subterranean formation and allowed to set or cure therein. In certain embodiments, for example, the cement slurry composition may be introduced into a space between a subterranean formation and a pipe string located in the subterranean formation. Embodiments may further comprise running the pipe string into a wellbore penetrating the subterranean formation. The cement slurry composition may be allowed to set or cure to form a hardened mass in the space between the subterranean formation and the pipe string. In addition, a cement composition may be used, for example, in squeeze-cementing operations or in the placement of cement plugs. Embodiments of the present invention further may comprise producing one or more hydrocarbons (e.g., oil, gas, etc.) from a well bore penetrating the subterranean formation.

The exemplary cement compositions disclosed herein may directly or indirectly affect one or more components or pieces of equipment associated with the preparation, delivery, recapture, recycling, reuse, and/or disposal of the disclosed cement compositions. For example, and with reference to FIG. 1, the disclosed cement compositions may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed compositions may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed compositions may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed compositions may be stored, reconditioned, and/or regulated until added to the drilling fluid 122.

As mentioned above, the disclosed compositions may directly or indirectly affect the components and equipment of the drilling assembly 100. For example, the disclosed compositions may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment. The fluid processing unit(s) 128 may further include one or more sensors, gauges, pumps, compressors, and the like used store, monitor, regulate, and/or recondition the exemplary cement compositions.

The disclosed compositions may directly or indirectly affect the pump 120, which representatively includes any conduits, pipelines, trucks, tubulars, and/or pipes used to fluidically convey the cement compositions downhole, any pumps, compressors, or motors (e.g., topside or downhole) used to drive the compositions into motion, any valves or related joints used to regulate the pressure or flow rate of the cement compositions, and any sensors (i.e., pressure, temperature, flow rate, etc.), gauges, and/or combinations thereof, and the like. The disclosed compositions may also directly or indirectly affect the mixing hopper 134 and the retention pit 132 and their assorted variations.

The disclosed compositions may also directly or indirectly affect the various downhole equipment and tools that may come into contact with the compositions such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed compositions may also directly or indirectly affect any downhole heat exchangers, valves and corresponding actuation devices, tool seals, packers and other wellbore isolation devices or components, and the like associated with the wellbore 116. The disclosed compositions may also directly or indirectly affect the drill bit 114, which may include, but is not limited to, roller cone bits, PDC bits, natural diamond bits, any hole openers, reamers, coring bits, etc.

While not specifically illustrated herein, the disclosed compositions may also directly or indirectly affect any transport or delivery equipment used to convey the compositions to the drilling assembly 100 such as, for example, any transport vessels, conduits, pipelines, trucks, tubulars, and/or pipes used to fluidically move the compositions from one location to another, any pumps, compressors, or motors used to drive the cement compositions into motion, any valves or related joints used to regulate the pressure or flow rate of the cement compositions, and any sensors (i.e., pressure and temperature), gauges, and/or combinations thereof, and the like.

Examples

The invention having been generally described, the following examples are given as particular embodiments of the invention and to demonstrate the practice and advantages hereof. It is understood that the examples are given by way of illustration and are not intended to limit the specification or the claims to follow in any manner.

TABLE 1

| Component | AS1 Amt (g) | AS1 % bw | AS2 Amt (g) | AS2 % bw |
|---|---|---|---|---|
| Water | 990 | 57.11% | 990 | 57.11% |
| Microbond HT | 720 | 41.54% | 720 | 41.54% |
| Viscosifying Additive | 5.4 | 0.31% | 5.4 | 0.31% |
| Lignin sulfonate | 18 | 1.04% | — | — |
| SAFC | — | — | 18 | 1.04% |
| Total | 1733.4 | 100.00% | 1733.4 | 100.00% |

SAFC = Sulfonated Acetone Formaldehyde Condensate

MICROBOND™ HT additive is an expanding cement additive containing dead-burned magnesium oxide, and is available from Halliburton Energy Services, Inc.

Anti-Shrinkage Additive Composition

Table 1 provides the formulation of representative aqueous liquid anti-shrinkage additives, hereafter referred to as AS1 and AS2. The order of addition begins with adding the viscosifying additive into stirring water to yield the viscosifying additive prior to addition of other components. This first step is performed to achieve proper suspension of the aqueous liquid anti-shrinkage additive.

Cement Compositions with Additive

Table 2 provides the formulations for test samples I-IV. All samples were prepared with TEXAS LEHIGH™ Class H cement, fresh water, and contain a defoaming additive. Sample I is formulated with a conventional solid anti-shrinkage additive, MICROBOND™ HT Additive; samples II and III contain AS1 and AS2, respectively; sample IV contains no/anti-shrinkage additive. All test samples were formulated to a density of 16.4 lbs per gallon. The aqueous liquid anti-shrinkage additives, AS1 and AS2, are 41.5% bw active suspensions, and, accordingly, the formulated amounts are such that the % bw active expansive ingredient for samples I-III are roughly equal. TEXAS LEHIGH™ H Cement is a Portland cement available from Texas Lehigh Cement Company, LP, in Buda, Tex.

TABLE 2

| Component | I Amt(g) | % bw | II Amt(g) | % bw | III Amt(g) | % bw | IV Amt(g) | % bw |
|---|---|---|---|---|---|---|---|---|
| TEXAS LEHIGH H | 402 | 68.28% | 405 | 68.80% | 405 | 68.80% | 420 | 71.2% |
| AS1 | — | — | 51 | 8.66% | — | — | — | — |
| AS2 | — | — | — | — | 51 | 8.66% | — | — |
| MICROBOND HT | 20.1 | 3.41% | — | — | — | — | — | — |
| D-AIR 3000 L | 0.66 | 0.11% | 0.67 | 0.11% | 0.67 | 0.11% | 0.69 | 0.1% |
| Fresh Water | 166 | 28.19% | 132 | 22.42% | 132 | 22.42% | 169 | 28.7% |
| Total | 588.76 | 100.00% | 588.67 | 100.00% | 588.67 | 100.00% | 589.69 | 100.0% |

Figure 2:
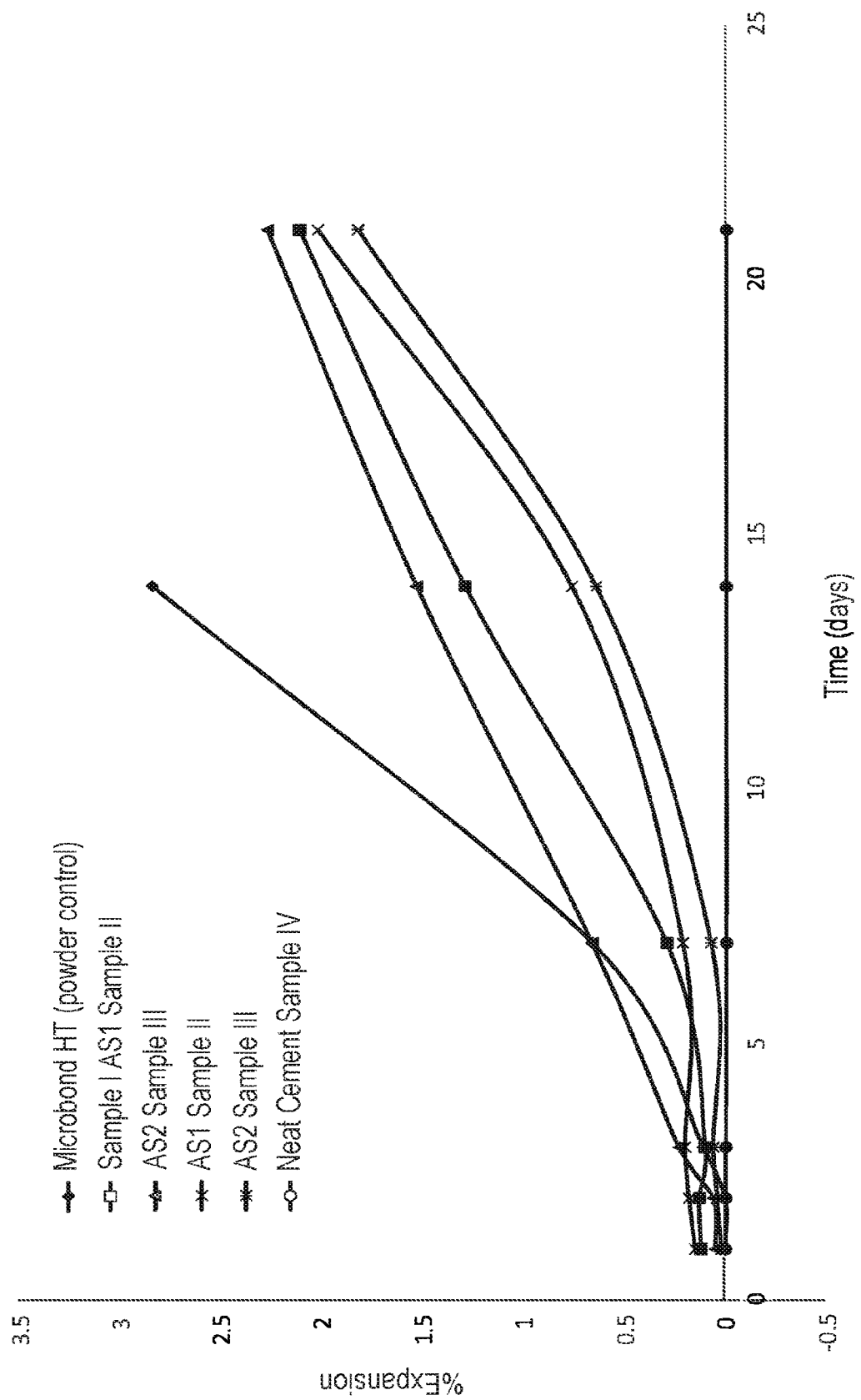
FIG. 2 is a graph of percent expansion of cement vs time according to embodiments utilizing the liquid anti-shrink additives of the invention.

Samples I-IV were cured in expansion ring molds at 190° F. (87.8° C.) under ambient pressure in a water bath, and volumetric expansion was measured according to API 10B-5 *Recommended Practice on Determination of Shrinkage and Expansion of Well Cement Formulations at Atmospheric Pressure*. Samples II and III were tested with anti-shrinkage additives aged 7 days and 30 days after preparation. Table 3 provides results of the expansion tests, and FIG. 2 charts the % expansion. D-AIR 3000L™ Defoamer is a cement defoamer available from Halliburton Energy Services, Inc.

TABLE 3

| | | | Expansion % at 190° F. | | | | | |
|---|---|---|---|---|---|---|---|---|
| Anti-shrinkage Additive | Sample No. | AS Age (days)[a] | Curing time (days) | | | | | |
| | | | 1 | 2 | 3 | 7 | 14 | 21 |
| MICROBOND HT | I | — | — | — | 0.11 | 0.66 | 2.84 | — |
| AS1 | II | 7 | 0.12 | 0.13 | 0.10 | 0.29 | 1.29 | 2.11 |
| AS2 | III | 7 | 0.05 | 0.06 | 0.23 | 0.66 | 1.53 | 2.27 |
| AS1 | II | 30 | 0.15 | 0.18 | 0.20 | 0.21 | 0.76 | 2.02 |
| AS2 | III | 30 | 0.02 | 0.04 | 0.06 | 0.07 | 0.64 | 1.82 |
| — | IV | — | −0.0024 | −0.0021 | −0.0027 | −0.0070 | −0.0052 | −0.0061 |

[a]Only tracked for Samples II and III.

Expansion was observed in Samples I-III, including with Samples II and III containing anti-shrinkage additives that had been in suspension for 30 days. Sample I, containing MICROBOND™ HT Additive demonstrated aggressive expansion, particularly at the 14 day measurement. Additional tests will need to be run to extend the expansion profile in Sample I. Sample II demonstrated comparable expansion performance when formulated with AS1 aged 7 days and 30 days. Although there is a noticeable discrepancy between the 7 day-aged and 30 day-aged % expansion measurements at 14 days of curing, the measurements at 1, 2, 3, 7, and 21 days of curing are very close. Sample III, exhibited a discrepancy between the 7 day-aged AS2 and 30 day-aged AS2% expansion measurements from day 3 through day 21. The data suggests, however, that the discrepancy at 21 days of curing is reducing and the % expansion is becoming comparable. Sample IV, which did not contain any anti-shrinkage additive, demonstrated shrinkage under the test conditions, and measured net negative % expansion from 1 through 21 days of curing. The data shows that the aqueous liquid anti-shrinkage additives of the invention may provide expansion in cement even after a shelf-life of, i.e. remaining in suspension, at least 30 days. Furthermore, liquid anti-shrinkage additives aged at least 30 days may exert comparable expansion performance in cement samples as the additives that were used much closer to the preparation, e.g. 7 days aged. This is demonstrated particularly well for AS1 in Sample II.

Cement Thickening Time

The anti-hydration agents employed in the aqueous liquid anti-shrinkage additives of the invention are commonly used as additives in Portland cement designs, i.e. as set retarding and dispersing additives. The effect, if any, on cement thickening time these additives would exert is investigated. Table 4 provides the results from thickening time tests on Samples I-IV.

TABLE 4

| 125° F. (52° C.) in 28 min 500-5280 psi (34-364 bar) (Hrs:Mins) to 30-100 Bc | | | | |
|---|---|---|---|---|
| Bc | I | II | III | IV |
| 30 | 1:11 | 0:01 | 0:12 | 1:30 |
| 40 | 1:25 | 1:31 | 1:08 | 1:53 |
| 50 | 1:36 | 1:37 | 1:18 | 1:55 |
| 70 | 1:54 | 1:45 | 1:36 | 2:03 |
| 100 | 2:11 | 1:57 | 2:00 | 2:13 |

Samples II and III, containing AS1 and AS2, respectively, measured higher initial consistency (30 Bc) than Sample I with conventional solid MICROBOND™ HT Additive and Sample IV without any expansive/anti-shrinkage additive. That being the case, all samples, measured thereafter comparably in time to reach 40, 50, 70, and 100 Bc. Thus, aside from increased initial consistency the anti-hydration agents in Samples II and III do not appear to impact thickening time.

X-Ray Diffraction

X-ray diffraction (XRD) was employed to screen the ability of different chemicals to serve as anti-hydration agents. XRD measurements report the relative amounts of periclase (magnesium oxide) to brucite (magnesium hydroxide) retained in an aqueous suspension of calcined magnesium oxide over time. Aqueous liquid anti-shrinkage additive test samples were prepared by suspending calcined magnesium oxide in water with an anti-hydration agent and viscosifier in a comparable formulation to AS1 and AS2. Table 5 provides the results from the XRD measurements of selected test samples with different anti-hydration agents and their concentrations.

TABLE 5

| | Periclase:Brucite Measured by XRD 28 Day Test Period | | | |
|---|---|---|---|---|
| | 7 d | 14 d | 21 d | 28 d |
| R-TEK ™, 5% bw | 99:1 | 99:1 | 99:1 | 99:1 |
| MMCR, 5% bw | 99:1 | 99:1 | 99:1 | 99:1 |
| HR-4 ™, 10% bw | 99:1 | 99:1 | 99:1 | 99:1 |
| HR-4 ™, 5% bw | 99:1 | 98:2 | 97:3 | 94:6 |
| CFR-3 ™, 5% bw* | 85:15 | 81:19 | 76:24 | 71:29 |
| SCR-100 ™, 5% bw | 99:1 | 87:13 | 80:20 | 73:27 |
| HALAD-413 ™, 5% bw | 99:1 | 90:10 | 83:17 | 76:24 |
| No Anti-hydration Agent | 97:3 | 89:11 | 87:13 | 86:14 |

*XRD screening for CFR-3 ™, 5% bw was initiated 7 days after sample preparation; all other anti-hydration agents were screened within 24 h of sample preparation.

R-TEK™ additive, 5% bw (SHMP), MICRO MATRIX™ Cement Retarder (MMCR), 5% bw (ATMP), and HR™-4 Retarder, 10% bw (lignin) were most successful at preventing hydration of magnesium oxide over the test period. In these test samples, XRD measured 99:1 periclase to brucite through 28 days. Reducing the concentration of HR™-4 Retarder to 5% bw resulted in lowered amount of retained periclase. Synthetic polymers SCR-100 and Halad-413 were the worst performers with periclase to brucite content of 73:27 and 76:24, respectively, after 28 days, which indicates significant hydration of magnesium hydroxide. The periclase content in test samples containing synthetic polymers was even lower after 28 days than that of the test sample containing no anti-hydration agent. R-TEK™ Additive is SHMP and is commercially available from Deepearth Solutions, Ltd. MICRO MATRIX™ Cement Retarder is ATMP, SCR-100™ Retarder is a nonlignosulfate cement retarder, HALAD™-413 Additive is a cement retarder, all of which are commercially available from Halliburton Energy Services, Inc., in Houston, Tex.

One of skill in the art will realize that the additives and cements of the present invention have several distinctive features. The aqueous liquid anti-shrinkage additives have not been used to promote cement. Only solid post-set or oil-based slurry state expansive liquid (aluminum powder only) versions have been used. Further, the additive in the invention is a liquid version of a magnesium oxide anti-shrinkage additive. The invention utilizes novel anti-hydration agents to stabilize the shelf life of calcined magnesium oxide in suspension without strongly impacting other properties of cement such as thickening time. Additionally, polyphosphonates and aminophosphonic acids (as well as salts therefrom), may be used as anti-hydration agents for the purposes of the invention. Further advantages include the facts that liquid additives as described herein are well-suited and preferred for off-shore use, particularly over oil-based liquids. Also, the aqueous liquid additives on the invention likely cost less than oil-based analogues.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Embodiments disclosed herein include:

A: A method comprising: introducing a well cementing composition into a wellbore, said cementing composition comprising a pumpable slurry of cement comprising a liquid anti-shrinkage additive comprising: an aqueous base fluid; a calcined magnesium oxide; and an anti-hydration agent; and allowing at least a portion of the cementing composition to harden.

B: An aqueous liquid anti-shrinkage additive for cement comprising: an aqueous base fluid; a calcined magnesium oxide; and an anti-hydration agent.

C: A composition for well cementing comprising: a pumpable slurry of cement comprising a liquid anti-shrinkage additive comprising: an aqueous base fluid; a calcined magnesium oxide; and an anti-hydration agent.

D: A cementing system comprising: an apparatus including a mixer and a pump to place a cement composition in a wellbore, said cement composition comprising: a pumpable slurry of cement comprising a liquid anti-shrinkage additive, the additive comprising calcined magnesium oxide, and an anti-hydration agent.

Each of embodiments A, B C, and D may have one or more of the following additional elements in any combination: Element 1: with the proviso that the liquid anti-shrinkage additive does not contain non-calcined magnesium oxide. Element 2: wherein the liquid anti-shrinkage additive further comprises a viscosifying additive. Element 3: wherein the calcined magnesium oxide is at least one selected from dead-burned magnesium oxide, light-burned magnesium, and combinations thereof. Element 4: wherein the anti-hydration agent comprises at least one of a lignin sulfonate, a sulfonated naphthalene condensate, a sulfonated acetone formaldehyde condensate (SAFC), a polyphosphate, an aminophosphonate, aminophosphonic acids, and combinations thereof. Element 5: wherein the anti-hydration agent is at least one selected from sodium hexametaphosphate (SHMP), aminotris(methylenephosphonic acid) (ATMP), and combinations thereof. Element 6: wherein the viscosifying additive comprises at least one of a polysaccharide biopolymer, a cellulosic polymer, a synthetic acrylic polymer, and combinations thereof. Element 7: wherein the polysaccharide biopolymer is at least one selected from xanthan, welan, diutan gums, and combinations thereof. Element 8: wherein the cellulosic polymer is hydroxyethyl cellulose (HEC). Element 9: wherein the synthetic acrylic polymer is at least one of poly(acrylic acid) (PAA), poly (acrylamide) (PAM), copolymers thereof (PAA-PAM), and combinations thereof. Element 10: wherein the liquid anti-shrinkage additive is stable after remaining in suspension for at least 30 days. Element 11: with the proviso that the pumpable slurry of cement does not contain non-calcined magnesium oxide.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method comprising:
   providing a liquid anti-shrinkage additive comprising:
     an aqueous base fluid;
     a calcined magnesium oxide;
     an anti-hydration agent; and
     a viscosifying additive; and
   preparing a cement slurry by combining a cement, water, and the liquid anti-shrinkage additive;
   introducing the cement slurry into a subterranean formation; and
   allowing at least a portion of cement slurry to harden.

2. The method of claim 1, with the proviso that the liquid anti-shrinkage additive does not contain non-calcined magnesium oxide.

3. The method of claim 1, wherein the calcined magnesium oxide is at least one selected from dead-burned magnesium oxide, light-burned magnesium, and combinations thereof.

4. The method of claim 1, wherein the anti-hydration agent comprises at least one of a lignin sulfonate, a sulfonated naphthalene condensate, a sulfonated acetone formaldehyde condensate (SAFC), a polyphosphate, an aminophosphonate, aminophosphonic acids, and combinations thereof.

5. The method of claim 4, wherein the anti-hydration agent is at least one selected from sodium hexametaphosphate (SHMP), aminotris(methylenephosphonic acid) (ATMP), and combinations thereof.

6. The method of claim 1, wherein the viscosifying additive comprises at least one of a polysaccharide biopolymer, a cellulosic polymer, a synthetic acrylic polymer and a combination thereof.

7. The method of claim 6, wherein the polysaccharide biopolymer is at least one selected from xanthan, welan, diutan gums, and combinations thereof, wherein the cellulosic polymer is hydroxyethyl cellulose (HEC) and wherein the synthetic acrylic polymer is at least one of poly(acrylic acid) (PAA), poly(acrylamide) (PAM), copolymers thereof (PAA-PAM), and combinations thereof.

8. A cementing system comprising:
   a liquid anti-shrinkage additive comprising:
     an aqueous base fluid;
     a calcined magnesium oxide; and
     an anti-hydration agent; and
   an apparatus including a mixer and a pump to place a cement composition in a wellbore, said cement composition comprising:
   a pumpable slurry of cement comprising the liquid anti-shrinkage additive, water, and a cement.

9. The system of claim 8, wherein the calcined magnesium oxide is at least one selected from dead-burned magnesium oxide, light-burned magnesium, and combinations thereof.

10. The system of claim 8, wherein the liquid anti-shrinkage additive is free of non-calcined magnesium oxide.

11. The system of claim 8, wherein the anti-hydration agent comprises at least one of a lignin sulfonate, a sulfonated naphthalene condensate, a sulfonated acetone formaldehyde condensate (SAFC), a polyphosphate, an aminophosphonate, aminophosphonic acids, and combinations thereof.

12. The system of claim 11, wherein the anti-hydration agent is at least one selected from sodium hexametaphosphate (SHMP), aminotris(methylenephosphonic acid) (ATMP), and combinations thereof.

13. The system of claim 8, wherein the liquid anti-shrinkage additive further comprises a viscosifying additive, the viscosifying additive comprising at least one of a polysaccharide biopolymer, a cellulosic polymer, a synthetic acrylic polymer, and combinations thereof.

14. The system of claim 13, wherein the polysaccharide biopolymer is at least one selected from xanthan, welan, diutan gums, and combinations thereof, wherein the cellulosic polymer is hydroxethyl cellulose (HEC) and wherein the synthetic acrylic polymer is at least one of poly(acrylic acid) PAA), poly(acrylamide) (PAM), copolymers thereof (PAA-PAM), and combinations thereof.

15. A method of wellbore cementing comprising:
   providing a liquid anti-shrinkage additive comprising:
     an aqueous base fluid;
     a calcined magnesium oxide; and
     an anti-hydration agent;
   preparing a cement composition by combining the liquid anti-shrinkage additive with a cement and water; and
   introducing the cement composition into a subterranean formation.

16. The method of claim 15, wherein the calcined magnesium oxide is at least one selected from dead-burned magnesium oxide, light-burned magnesium, and combinations thereof.

17. The method of claim 15, wherein the anti-hydration agent is at least one selected from sodium hexametaphosphate (SHMP), aminotris(methylenephosphonic acid) (ATMP), and combinations thereof.

18. The method of claim 15, wherein the liquid anti-shrinkage additive further comprises a viscosifying additive, the viscosifying additive comprising at least one of a polysaccharide biopolymer, a cellulosic polymer, a synthetic acrylic polymer, and combinations thereof, wherein the polysaccharide biopolymer is at least one selected from xanthan, welan, diutan gums, and combinations thereof, wherein the cellulosic polymer is hydroxyethyl cellulose (HEC) and wherein the synthetic acrylic polymer is at least one of poly(acrylic acid) (PAA), poly(acrylamide) (PAM), copolymers thereof (PAA-PAM), and combinations there.

* * * * *